Patented Feb. 22, 1927.

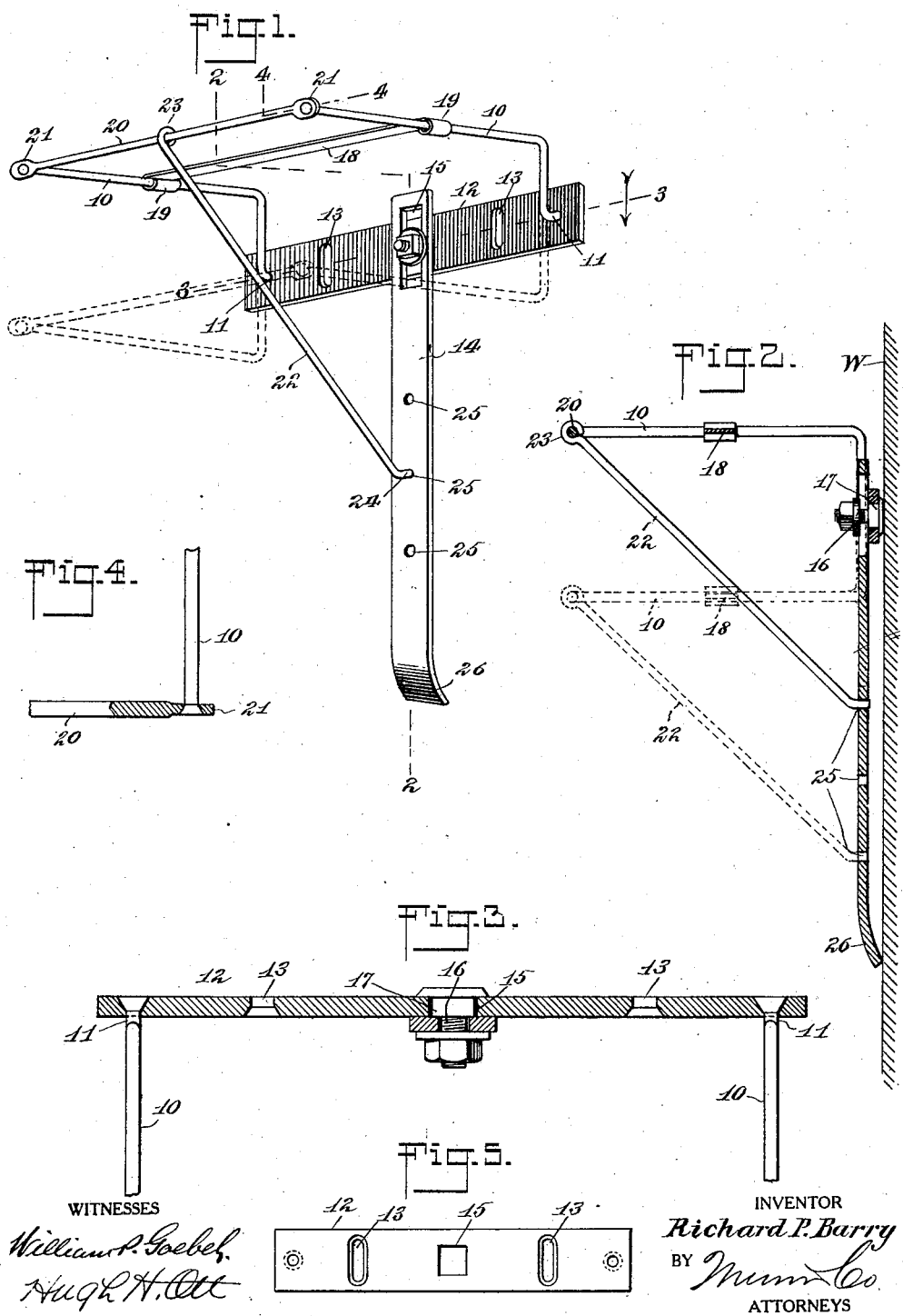

UNITED STATES PATENT OFFICE.

RICHARD P. BARRY, OF CARLE PLACE, NEW YORK, ASSIGNOR OF ONE-THIRD TO EMIL J. KUBAT, OF BROOKLYN, NEW YORK, AND ONE-THIRD TO AUGUST PARROT, OF JAMAICA, NEW YORK.

ADJUSTABLE BRACKET.

Application filed September 30, 1925. Serial No. 59,613.

This invention relates to supporting devices, and has particular reference to a supporting bracket which is especially designed for supporting gas or electric meters or any other devices of this nature, from a wall or other vertical surface.

One of the outstanding objects of the present invention is to provide a supporting bracket having a wide range of adjustment after its initial securement by anchoring means to a wall.

The invention furthermore comprehends a supporting bracket of the character set forth, by virtue of which various intermediate adjustments between the maximum and minimum adjustments may be obtained whereby the device to be supported may be readily raised or lowered without the necessity of disturbing the anchoring devices which attach the bracket to the wall.

More specifically the invention comprehends a supporting bracket including a base adapted to be anchored to a wall and outwardly projecting connected bracket arms each having offset crank portions journaled in the base for rotation to permit of the raising and lowering of the arms with respect to the base by turning the same upon their journaled offset crank portions, together with retaining and bracing means for maintaining said arms in their various raised and lowered adjusted positions.

The invention furthermore contemplates in a bracket of the character described, a substantially cruciform base, to the horizontal element of which the offset crank portions are journaled, and which horizontal element is adjustably anchored to a wall and in which the vertical element of said cruciform base is relatively adjustable with respect to the horizontal element, said vertical element being adapted to receive and co-operate with the retaining and bracing means for the bracket arm.

The invention furthermore comprehends an adjustable supporting bracket which is strong and durable, yet simple in its construction and mode of operation; which is inexpensive to manufacture and install, and which is thoroughly reliable and highly efficient in its purpose.

With the above recited and other objects in view, reference is had to the following specification and accompanying drawings, in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a perspective view of a bracket constructed in accordance with the invention, with the bracket arms illustrated respectively in full and dotted lines, as swung to the maximum raised and lowered positions with respect to the horizontal element of the cruciform base;

Fig. 2 is a vertical sectional view therethrough taken approximately on the line 2—2 of Fig. 1;

Fig. 3 is a fragmentary horizontal sectional view taken approximately on the line 3—3 of Fig. 1;

Fig. 4 is a fragmentary horizontal sectional view taken approximately on the line 4—4 of Fig. 1;

Fig. 5 is a face view of the horizontal element of the base disconnected from the other parts of the device.

Referring to the drawings by characters of reference, the bracket includes a plurality of supporting arms 10, each having an offset crank portion 11 at its inner end journaled in the horizontal element 12 of a cruciform base, whereby turning movement of the bracket arms 10 upon the crank portions 11, permits of vertical swinging adjustments of said arms with respect to the element 12. The element 12 is provided with laterally spaced parallel slots 13 adapted to receive therethrough anchoring devices for attaching the complete bracket to a wall or other support W, and hence allowing for a limited vertical adjustment of the element 12 with respect to the wall, and this without the necessity of removing or disturbing the anchoring devices. The cruciform base includes a vertical element 14 having a slot 15 at its upper end for the reception of a bolt 16 passing through an opening 17 in the element 12, whereby the vertical element 14 is capable of relative adjustment with respect to the horizontal element 12 of the base. The bracket arms 10 are connected intermediate their ends by a strap 18, the terminals 19 of which are coiled about the arms which are preferably of circular configuration in cross section. The free outer ends of the arms are connected by a cross rod 20, in the opposite ends 21 of which the free ends of the bracket arms 10 are journaled. In order to provide means for retaining and bracing the bracket arms in their relative vertically adjusted positions with respect to the element 12, a brace rod 22 is provided, which is swingably connected to the cross rod 20 by an embracing eye 23 at its upper end. The lower extremity 24 of the brace rod 22 is bent at an angle to the major portion of its length and is adapted to be selectively engaged in a series of keeper openings 25 formed in the vertical element 14 of the cruciform base. The lower extremity 26 of the element 14 is rearwardly offset sufficiently to engage with the surface of the wall W from which the bracket is supported.

In use and operation, the cross element 12 of the base is anchored to the wall W by suitable anchoring devices (not shown), such as screws, bolts, or the like. With the angular lower terminal 24 of the brace rod 22 disengaged from the keeper openings 25, the arms 10 are swung upon their offset crank portions 11 to dispose the same in the desired vertically adjusted relation to the horizontal base element 12, after which the angular terminal 24 is inserted in the desired keeper opening 25 to maintain and brace the bracket arms 10 in this position. If none of the keeper openings 25 register with the adjusted position of the arms 10 which is desired, independent vertical adjustment of the element 14 of the base with respect to the element 12 may be accomplished by loosening the nut of the bolt 16 and sliding the element 14 to the position desired, after which the nut is tightened to maintain the position.

In addition to the maximum raised and lowered positions of the bracket arms 10 with respect to the element 12, there is a further adjustment possible without disturbing or removing the anchoring devices, by sliding the slotted portions 13 of the element 12 upon the anchoring devices.

It will be further noted that the bracket arms 10 may be swung to various intermediate positions between the uppermost and lowermost positions, and if desired, the vertical element 14 of the base may be swung laterally at an angle for the purpose of disposing the keeper openings 25 in a proper receptive position for the angular terminal 24 of the brace rod 22. When the complete bracket has been suitably adjusted, the meter or other device to be supported therefrom is mounted upon the bracket arms 10, the cross strap 18 and the cross rod 20, and secured thereto if desired.

From the foregoing it will thus be seen that a supporting bracket has been designed which has a wide range of adjustments and which allows for intermediate adjustments between the maximum and minimum.

What is claimed is:

1. An adjustable supporting bracket including a base, supporting arms having offset crank portions journaled in the base for complete rotation to permit of relative vertical adjustment with respect to the base to constitute a shelf, and means for holding said supporting arms in adjusted relation.

2. An adjustable supporting bracket including a base, supporting arms having offset crank portions journaled in the base for complete rotation to permit of relative vertical adjustment with respect to the base to constitute a shelf, and means for holding said supporting arms in adjusted relation, said means comprising a combined brace and retaining rod carried by the supporting arms, and an adjustable keeper member carried by the base and constituting a part of said base.

3. A supporting bracket including a base adapted for attachment to a wall, a supporting shelf consisting of horizontally-disposed arms, each having an offset crank terminal journaled in the base and connecting cross members journaled to the arms whereby to permit of vertical adjustments of the shelf by turning movement of the arms.

4. A supporting bracket including a base adapted for attachment to a wall, a supporting shelf consisting of horizontally disposed arms, each having an offset crank terminal journaled in the base, and connecting cross members journaled to the arms whereby to permit of vertical adjustments of the shelf by turning movement of the arms, and means for bracing and retaining the shelf in its adjusted positions, comprising a rod swingably carried by the shelf and a keeper member adjustably carried by the base.

5. A supporting bracket including a base adapted for attachment to a wall, a supporting shelf consisting of horizontally disposed arms, each having an offset crank terminal journaled in the base and connecting cross members journaled to the arms whereby to permit of vertical adjustments of the shelf by turning movement of the arms, and means for bracing and retaining the shelf in its adjusted position, comprising a rod swingably carried by the shelf, and a keeper member adjustably carried by the base, said keeper member consisting of a bar having a plurality of keeper openings adapted to selectively receive the free terminal of the rod.

6. A supporting bracket including a base having parallel vertically slotted portions for the reception therethrough of anchoring devices to adjustably attach the same to a wall, a supporting shelf consisting of horizontally disposed arms, each having offset crank terminals journaled in the base and connecting cross members journaled to the arms whereby to permit of vertical adjustments of the shelf by turning movement of the arms, and means for retaining and bracing the shelf in its horizontally adjusted positions, including a rod swingably carried by the shelf and a keeper member adjustably carried by the base having a series of keeper openings adapted to selectively receive the free terminal of the rod.

RICHARD P. BARRY.